(12) United States Patent
Xu et al.

(10) Patent No.: US 12,431,919 B2
(45) Date of Patent: Sep. 30, 2025

(54) METHOD FOR OPTIMIZING LOW-BAND-LOW-BAND CARRIER-AGGREGATION TRANSMIT AND RECEIVE PERFORMANCE

(71) Applicant: SKYWORKS SOLUTIONS, INC., Irvine, CA (US)

(72) Inventors: Sarah Shihui Xu, Thousand Oaks, CA (US); Anand Vijaykumar, Simi Valley, CA (US); Lu Liu, Newbury Park, CA (US); John C. Baldwin, Simi Valley, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 364 days.

(21) Appl. No.: 18/066,674

(22) Filed: Dec. 15, 2022

(65) Prior Publication Data

US 2023/0188165 A1 Jun. 15, 2023

Related U.S. Application Data

(60) Provisional application No. 63/265,459, filed on Dec. 15, 2021.

(51) Int. Cl.
 *H04B 1/52* (2015.01)
 *H04B 1/00* (2006.01)

(52) U.S. Cl.
 CPC ........... *H04B 1/0057* (2013.01); *H04B 1/006* (2013.01)

(58) Field of Classification Search
 CPC .............................. H04B 1/0057; H04B 1/006
 USPC ...................................................... 455/552.1
 See application file for complete search history.

(56) References Cited

U.S. PATENT DOCUMENTS

| | | | |
|---|---|---|---|
| 9,621,327 B2 | 4/2017 | Chang et al. | |
| 11,368,179 B2 * | 6/2022 | Pehlke | H04B 1/40 |
| 2012/0146742 A1 * | 6/2012 | Caron | H04B 1/109 |
| | | | 333/132 |
| 2015/0133067 A1 * | 5/2015 | Chang | H04B 1/006 |
| | | | 455/78 |
| 2019/0041493 A1 * | 2/2019 | Greenberg | G01S 7/411 |

* cited by examiner

*Primary Examiner* — Tanmay K Shah
(74) *Attorney, Agent, or Firm* — Lando & Anastasi, LLP

(57) ABSTRACT

Aspects of the disclosure include a wireless device comprising one or more antennas, a first duplexer configured to receive a transmit signal and a first carrier-aggregated receive signal, a second duplexer configured to receive a second carrier-aggregated receive signal, an antenna switch module (ASM) coupled between the first duplexer and the second duplexer and the one or more antennas, one or more phase-shifting components, and at least one controller configured to selectively couple at least one phase-shifting component of the one or more phase-shifting components to the ASM based on a respective frequency of each of the transmit signal, the first carrier-aggregated receive signal, and the second carrier-aggregated receive signal.

18 Claims, 4 Drawing Sheets

METHOD FOR OPTIMIZING LOW-BAND-LOW-BAND CARRIER-AGGREGATION TRANSMIT AND RECEIVE PERFORMANCE

CROSS-REFERENCE TO RELATED APPLICATIONS

This application claims priority under 35 U.S.C. § 119 (e) to U.S. Provisional Application Ser. No. 63/265,459, titled "METHOD FOR OPTIMIZING LOW-BAND-LOW-BAND CARRIER-AGREGATION TRANSMIT AND RECEIVE PERFORMANCE," filed on Dec. 15, 2021, which is hereby incorporated by reference in its entirety.

BACKGROUND

1. Field of the Disclosure

At least one example in accordance with the present disclosure relates generally to carrier aggregation in wireless communications.

2. Discussion of Related Art

Mobile devices such as smartphones may exchange wireless communications with base stations. Base stations may send wireless communications to mobile devices on any of several carrier signals broadly categorized into one of a low-band, mid-band, or high-band frequency range. Carrier aggregation is a technique that enables a base station to send wireless communications on several carriers simultaneously. Carrier aggregation increases a rate of data transfer as compared to transmitting wireless communications on a single frequency band.

SUMMARY

According to at least one aspect of the present disclosure, a wireless device is provided comprising one or more antennas, a first duplexer configured to receive a transmit signal and a first carrier-aggregated receive signal, a second duplexer configured to receive a second carrier-aggregated receive signal, an antenna switch module (ASM) coupled between the first duplexer and the second duplexer and the one or more antennas, one or more phase-shifting components, and at least one controller configured to selectively couple at least one phase-shifting component of the one or more phase-shifting components to the ASM based on a respective frequency of each of the transmit signal, the first carrier-aggregated receive signal, and the second carrier-aggregated receive signal.

In various examples, the wireless device includes at least one transmit switch coupled to the first duplexer and the second duplexer. In some examples, the at least one controller is configured to select the at least one of the one or more phase-shifting components based on a state of the transmit switch. In at least one example, the one or more phase-shifting components include at least one of a capacitor or an inductor. In various examples, the transmit signal and the first carrier-aggregated receive signal belong to a first frequency band. In some examples, the second carrier-aggregated receive signal belongs to a second frequency band different than the first frequency band. In at least one example, the method includes one or more switching devices, each switching device being coupled to a respective phase-shifting component of the one or more phase-shifting components. In various examples, the one or more switching devices includes a first switching device coupled to the at least one phase-shifting component, and selectively coupling the at least one phase-shifting component to the ASM includes controlling the first switching device to be in a closed and conducting position.

According to at least one aspect of the disclosure, a method of controlling a wireless device having one or more antennas, an antenna switch module (ASM) coupled to the one or more antennas, and one or more phase-shifting components is provided, the method comprising, providing, by the ASM, a transmit signal to the one or more antennas, the transmit signal having a first frequency, receiving, by the ASM, a first carrier-aggregated receive signal having a second frequency and a second carrier-aggregated receive signal having a third frequency from the one or more antennas, and selectively coupling at least one phase-shifting component of the one or more phase-shifting components to the ASM based on the first frequency, the second frequency, and the third frequency.

In various examples, the wireless device includes a transmit switch, and the method includes routing, by the transmit switch, the transmit signal to the ASM. In some examples, the method includes selecting the at least one phase-shifting component to selectively couple to the ASM based on a state of the transmit switch. In at least one example, the one or more phase-shifting components include at least one of a capacitor or an inductor. In various examples, the first frequency and the second frequency belong to a first frequency band. In some examples, the third frequency does not belong to the first frequency band. In at least one example, the wireless device includes one or more switching devices, each coupled to a respective phase-shifting component of the one or more phase-shifting components, and selectively coupling the at least one phase-shifting component to the ASM includes controlling a respective switching device to be in a closed and conducting position.

According to at least one aspect of the disclosure, a non-transitory computer-readable medium storing thereon sequences of computer-executable instructions for controlling a wireless device having one or more antennas, an antenna switch module (ASM) coupled to the one or more antennas, and one or more phase-shifting components is provided, the sequences of computer-executable instructions including instructions that instruct at least one processor to control the ASM to route a transmit signal to the one or more antennas, the transmit signal having a first frequency, control the ASM to route a first carrier-aggregated receive signal having a second frequency and a second carrier-aggregated receive signal having a third frequency from the one or more antennas, and selectively couple at least one phase-shifting component of the one or more phase-shifting components to the ASM based on the first frequency, the second frequency, and the third frequency.

In various examples, the wireless device includes a transmit switch, and the instructions further instruct the at least one processor to control the transmit switch to route the transmit signal to the ASM. In some examples, the instructions further instruct the at least one processor to select the at least one phase-shifting component to selectively couple to the ASM based on a state of the transmit switch. In at least one example, the first frequency and the second frequency belong to a first frequency band, and the third frequency does not belong to the first frequency band. In various examples, the wireless device includes one or more switching devices, each coupled to a respective phase-shifting component of the one or more phase-shifting components, and selectively coupling the at least one phase-shifting component to the ASM includes controlling a respective switching device to be in a closed and conducting position.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 1:
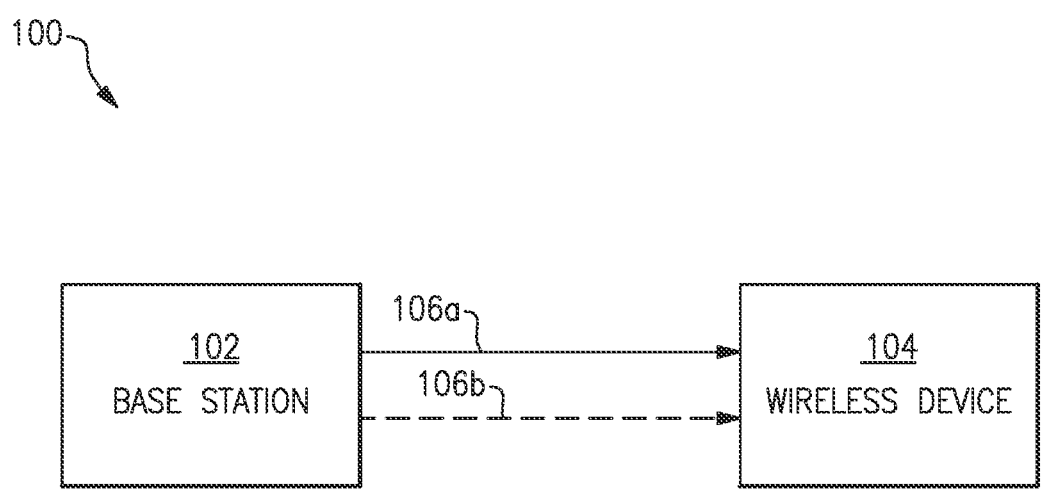
FIG. 1 illustrates a block diagram of a wireless-communication system employing carrier aggregation according to an example.

As discussed above, carrier aggregation increases data-transfer speeds from a base station to a mobile device by transmitting information on multiple carriers simultaneously. FIG. 1 illustrates a block diagram of a wireless-communication system 100 employing carrier aggregation according to an example. The wireless-communication system 100 includes a base station 102 and a wireless device 104. The base station 102 is communicatively coupled to, and exchanges wireless signals with, the wireless device 104. For example, the base station 102 may employ carrier aggregation to communicate information to the wireless device 104 via a first carrier 106a and a second carrier 106b (collectively, "carriers 106") simultaneously. Transmitting information via the carriers 106 simultaneously may enable faster information-transmission speeds than either of the carriers 106a, 106b is capable of achieving individually.

Carrier aggregation may be considered intra-band or inter-band. Intra-band carrier aggregation refers to a configuration in which two carriers, such as the carriers 106, fall within the same frequency band, such as the low band, mid band, or high band. Inter-band carrier aggregation refers to a configuration in which two carriers, such as the carriers 106, fall within different frequency bands. For example, if the first carrier 106a falls within the low band and the second carrier 106b falls within the mid band, the carriers 106 may be considered to be transmitted via inter-band carrier aggregation. Conversely, if the first carrier 106a and the second carrier 106b both fall within the low band, the carriers 106 may be considered to be transmitted via intra-band (and, in this example, intra-low-band) carrier aggregation.

Carrier aggregation, and particularly intra-band carrier aggregation, may introduce challenges to the wireless device 104. For example, the wireless device 104 may include several antennas each configured to receive a respective carrier simultaneously while the carriers are being transmitted to the wireless device 104. The wireless device 104 may also transmit signals on the same frequency band as one of the carriers. A signal path in the wireless device 104 for one carrier may affect transmit performance in the other carrier frequency. For example, if carrier-aggregation is implemented for a first band and a second band, but a transmit signal is also being sent on the first band, a duplexer corresponding to the second band may undesirably load a duplexer corresponding to the first band. This duplexer loading may impact performance of the transmit signal in the first band.

When multiple carriers are received by multiple antennas, antenna-matching-value requirements may differ from the individual requirements of the constituent antennas. Continuing with the example above, antenna-matching requirements for a transmit signal in the first band may differ in single-band mode (that is, when carrier aggregation is not being employed) as compared to a carrier-aggregation mode due to the loading effects from the second band. These challenges may be particularly pronounced in the context of intra-low-band carrier aggregation, because aggregated carriers in the low band may be separated by relatively narrow frequency gaps as compared to the mid or high bands.

Accordingly, an antenna coupled to a receive duplexer may disadvantageously load an antenna in the transmit path. This loading alters an impedance presented to a power amplifier in the transmit path, which adversely impacts linearity and power performance of the power amplifier. The loading in the transmit path presented to the power amplifier varies based on which duplexer is currently connected to the power amplifier by a transmit switch, and which antenna is currently connected to the power amplifier by an antenna switch module. In light of the foregoing, carrier aggregation may impose certain challenges that degrade a performance of the wireless device 104, particularly in the context of intra-low-band carrier aggregation.

Examples of the disclosure provide switchable phase shifters to mitigate at least some of the foregoing concerns. In one example, signal paths in a wireless device include one or more switchable phase-shifting components selectively couplable to an antenna switch module. Each of the one or more switchable phase-shifting components may be selectively coupled in a corresponding path as desired. For example, the phase-shifting components may be coupled in the corresponding path during certain implementations of carrier aggregation. Similarly, each of the one or more switchable phase-shifting components may be selectively decoupled from the corresponding path when appropriate, for example, when the corresponding path is employed with single-carrier communication. Consequently, performance of the wireless device during carrier aggregation may be improved without adversely impacting performance of the wireless device while carrier aggregation is not employed such that overall performance of the wireless device is enhanced.

Because the loading varies based on the state of the transmit switch and the antenna switch module (ASM), as discussed above, a logic to select a phase shifting component (such as an inductive, resistive, or capacitive element or elements) may be dictated by the state of the transmit switch and the ASM. This may ensure that each potential transmit path is correlated to an appropriate inductive or capacitive element to offset the undesired loading on the power amplifier. Examples of the disclosure thereby improve performance of the power amplifier.

Figure 2:
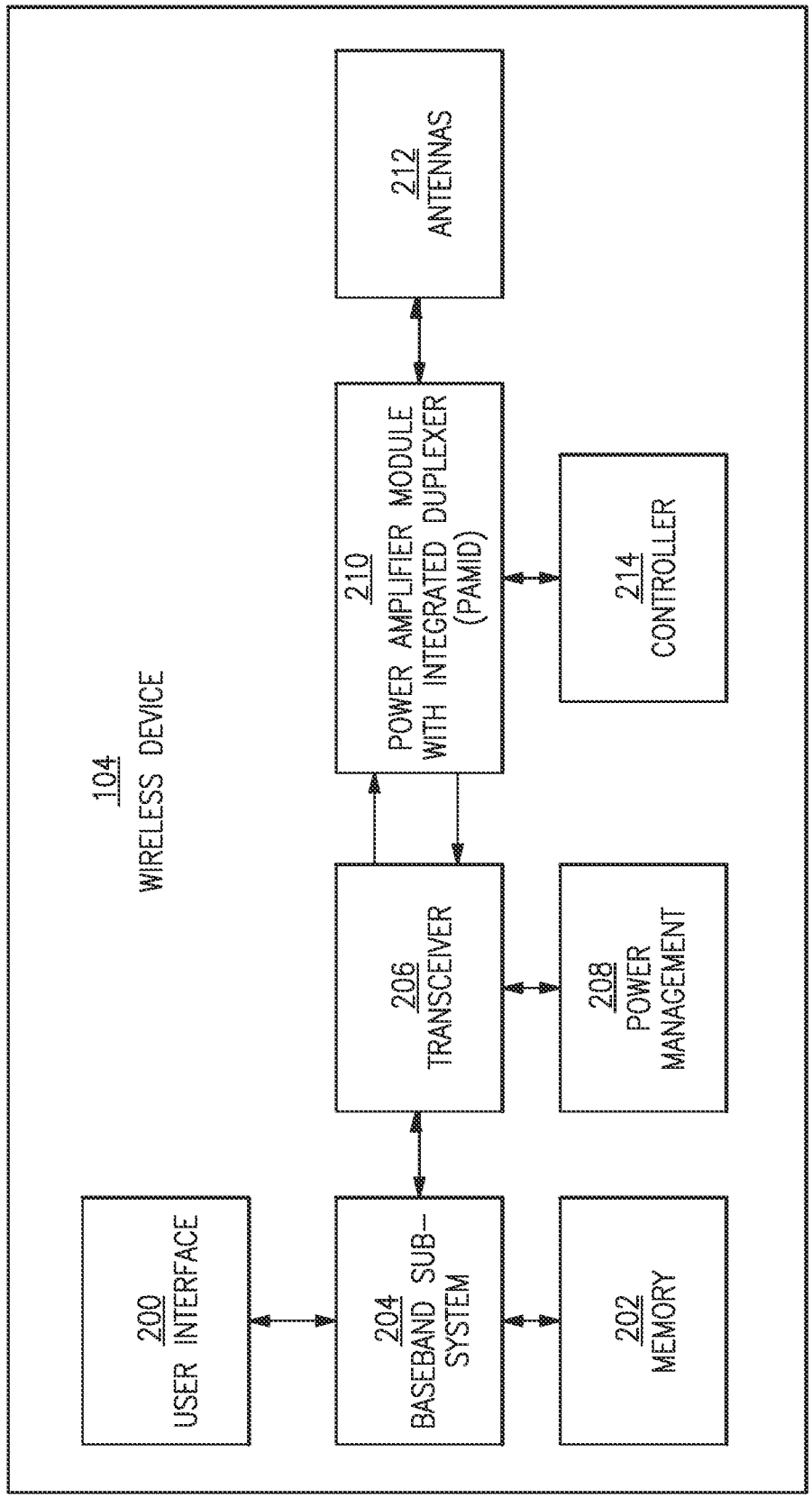
FIG. 2 illustrates a block diagram of a wireless device according to an example.

FIG. 2 illustrates a block diagram of the wireless device 104 according to an example. The wireless device 104 includes a user interface 200, a memory and/or storage 202 ("memory 202"), a baseband sub-system 204, a transceiver 206, a power-management system 208, a power-amplifier module with integrated duplexer (PAMID) 210, one or more antennas 212 ("antennas 212"), and one or more controllers 214 ("controller 214")

The user interface 200 is coupled to the baseband sub-system 204. The memory 202 is coupled to the baseband sub-system 204. The baseband sub-system 204 is coupled to the user interface 200, the memory 202, and the transceiver 206. The transceiver 206 is coupled to the baseband sub-system 204, the power-management system 208, and the PAMID 210. The power-management system 208 is coupled to the transceiver 206. The PAMID 210 is coupled to the transceiver 206, the antennas 212, and the controller 214. The antennas 212 are coupled to the PAMID 210 and are configured to be communicatively coupled to at least one external device, such as a base station. The controller 214 is coupled to the PAMID 210.

The wireless device 104 may include additional, different, or rearranged components in some examples. Illustrated components and connections therebetween are provided for purposes of explanation and are not intended to be limiting. The wireless device 104 may include different components with different connections in alternate examples.

The antennas 212 are configured to transmit and/or receive one or more signals, such that the wireless device 104 may communicate with one or more external devices via the antennas 212. For example, the antennas 212 may be communicatively coupled to at least one base station. The transceiver 206 is configured to generate signals for transmission and/or to process received signals. In some embodiments, transmission and reception functionalities can be implemented in separate components (for example, a transmit module and a receiving module) or be implemented in the same module.

Signals generated for transmission are provided from the transceiver 206 to the PAMID 210, which amplifies the generated signals from the transceiver 206. As will be appreciated by those skilled in the art, the PAMID 210 can include one or more power amplifiers, switches, duplexers, antenna switch modules, and so forth, as discussed below with respect to FIG. 3. The PAMID 210 can be used to amplify a wide variety of radio-frequency (RF) or other frequency-band transmission signals. For example, the PAMID 210 can receive an enable signal that can be used to pulse the output of a power amplifier to aid in transmitting a wireless local-area-network (WLAN) signal or any other suitable pulsed signal. The PAMID 210 can be configured to amplify any of a variety of types of signal, including, for example, 5G signals, a Global System for Mobile (GSM) signal, a code-division multiple-access (CDMA) signal, a W-CDMA signal, a Long-Term-Evolution (LTE) signal, an EDGE signal, and so forth. In certain examples, the PAMID 210 and associated components including switches and the like can be fabricated on GaAs substrates using, for example, pHEMT or BiFET transistors, or on a silicon substrate using CMOS transistors. The PAMID 210 may further include one or more low-noise amplifiers (LNAs) configured to amplify received signals in a similar or different manner as PAs of the PAMID 210.

In some examples, the PAMID 210 may include, or be coupled to, one or more couplers. The one or more couplers may each include one or more coupler sections for measuring transmitted power signals from the PAMID 210 and/or for providing one or more coupled signals to the transceiver 206. For example, the PAMID 210 may include, or be coupled to, one or more sensors configured to receive information from the one or more couplers and provide information to the transceiver 206, power-management system 208, and/or other components. The information may be used to, for example, make adjustments to regulate the power level of one or more PAs and/or LNAs in the PAMID 210. In this way the one or more couplers can be used to boost and/or decrease the power of a transmission signal having a relatively low or high power. However, the one or more couplers can be used in a variety of other implementations. For example, in certain examples in which the wireless device 104 is a mobile phone having a time division multiple access (TDMA) architecture, the one or more couplers can advantageously manage the amplification of an RF transmitted power signal from PAs and/or LNAs. In a mobile phone having a TDMA architecture, such as those found in GSM, CDMA, and W-CDMA systems, the PAMID 210 can be used to shift power envelopes up and down within prescribed limits of power versus time. In such systems, the one or more couplers can be used to measure the power of a power-amplifier output signal to aid in controlling the PAMID 210 (for example, one or more PAs and/or LNAs), as discussed above.

Figure 3:
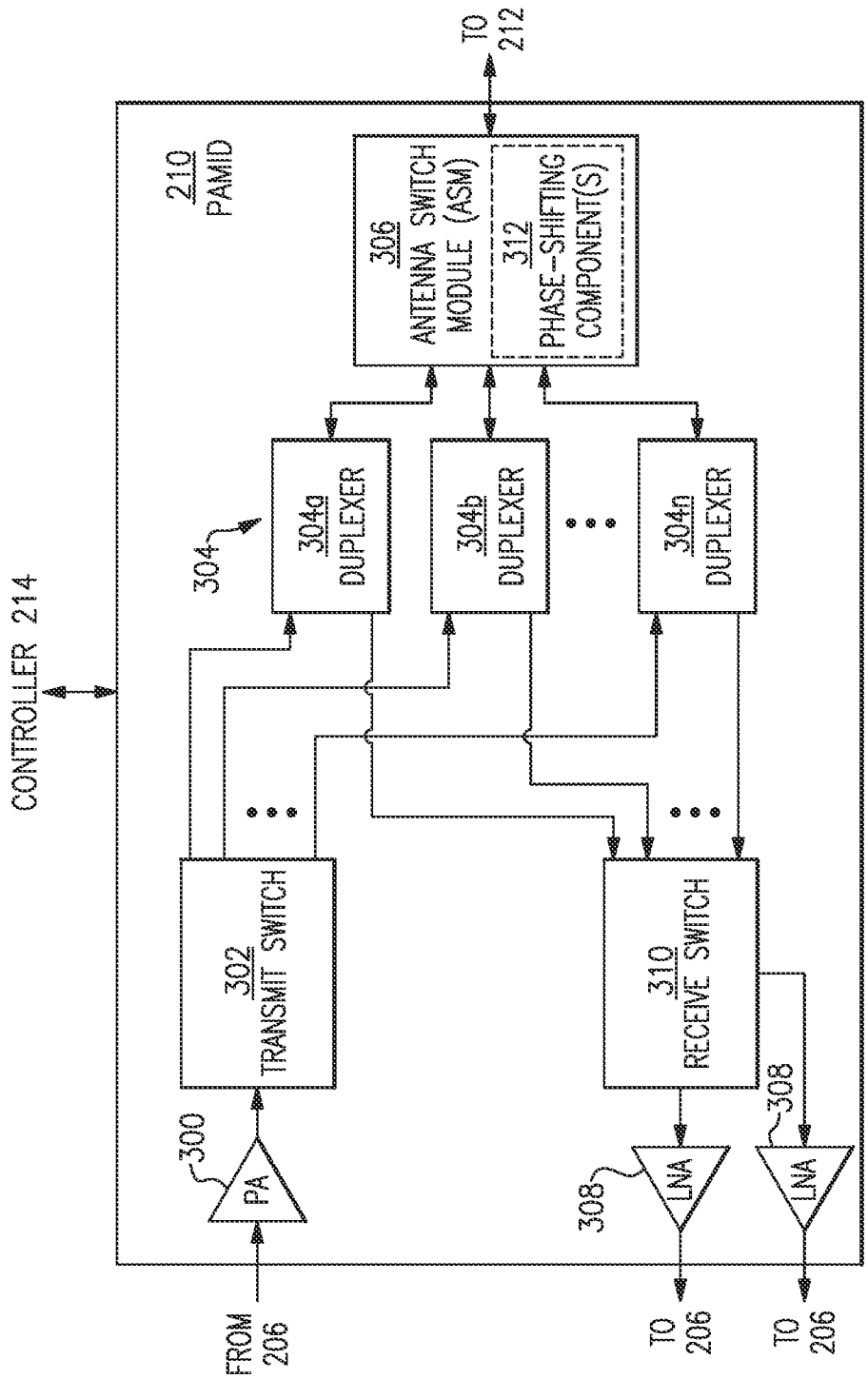
FIG. 3 illustrates a block diagram of a power-amplifier module with integrated duplexer according to an example.

As discussed above, the PAMID 210 may be configured to route transmit and/or receive signals between the transceiver 206 and the antennas 212. FIG. 3 illustrates a block diagram of the PAMID 210 according to one example. The PAMID 210 includes one or more PAs 300 ("PA 300"), a transmit switch 302, an arbitrary number of duplexers 304, an antenna switch module (ASM) 306, one or more LNAs 308 ("LNAs 308"), and one or more receive switches 310 ("receive switch 310").

The PA 300 has an input configured to be coupled to the transceiver 206, and an output coupled to the transmit switch 302. An impedance presented to the PA 300 may depend on a transmit path between the PA 300 and the antennas 212 which may, in turn, depend on a state of the transmit switch 302 and a state of the ASM 306. The transmit switch 302 includes an input coupled to the PA 300 and an arbitrary number of outputs each coupled to a respective duplexer of the duplexers 304. Each of the duplexers 304 includes an input coupled to the transmit switch 302, an output coupled to the receive switch 310, and an input/output coupled to the ASM 306.

The ASM 306 includes an arbitrary number of input/outputs each coupled to a respective duplexer of the duplexers 304, and an input/output coupled to the antennas 212. The LNAs 308 each include an output configured to be coupled to the transceiver 206, and an input coupled to the receive switch 310. In some examples, each of the LNAs 308 includes an input coupled to a respective receive switch of the receive switch 310. For example, the LNAs 308 may include two LNAs and the receive switch 310 may include two receive switches, where each LNA includes an input coupled to a respective one of the two receive switches. The receive switch 310 includes an arbitrary number of inputs each coupled to a respective duplexer of the duplexers 304, and an output coupled to the LNA 308.

FIG. 3 illustrates one example of the PAMID 210. In various examples, alternate or additional components, and/or connections therebetween, of the PAMID 210 may be implemented. For example, in some examples the PAMID 210 may include one or more filters, one or more switching devices, one or more couplers (for example, coupled to the ASM 306), one or more clocks, one or more power-supply components, and so forth, which are omitted for purposes of clarity.

As discussed above, the PAMID 210 is configured to transmit and/or receive one or more signals between the transceiver 206 and antennas 212. For example, a transmit signal received at the PA 300 from the transceiver 206 may be amplified and provided to the transmit switch 302. The transmit switch 302 may route the transmit signal to a desired one of the duplexers 304. As appreciated by one of ordinary skill in the art, a duplexer may be considered analogous to a single pole, double-throw switch and enables bi-directional communication over a single antenna channel by isolating a transmitter from a receiver. Each of the duplexers 304 may correspond to a respective frequency band. Accordingly, the transmit switch 302 may route the transmit signal to a duplexer corresponding to the frequency band of the transmit signal.

In one example, a state of the transmit switch 302 (for example, corresponding to which of the duplexers 304 the transmit switch 302 couples to the PA 300) is controlled by the controller 214 and/or another control device. For example, the controller 214 may control the state of the transmit switch 302 based on a frequency band of the transmit signal. For purposes of example, the transmit switch 302 may route the transmit signal to a first duplexer 304a because the first duplexer 304a corresponds to a frequency band of the transmit signal. The first duplexer 304a receives the transmit signal and provides the transmit signal to the ASM 306. The ASM 306 is configured to route the transmit signal to the antennas 212, which transmits the transmit signal to a receiving entity (for example, a base station). In some examples, a state of the ASM 306 is controlled by the controller 214.

In another example, a receive signal is received at the ASM 306 from the antennas 212. The ASM 306 routes the receive signal to an appropriate one of the duplexers 304. For example, the ASM 306 may route the receive signal to a duplexer corresponding to the frequency band of the receive signal. The controller 214 may control a state of the ASM 306. As discussed in greater detail below, the controller 214 may control the state of the ASM 306 during carrier aggregation based on a state of the transmit switch 302. For purposes of example, the ASM 306 may route the receive signal to a second duplexer 304b. The second duplexer 304b provides the receive signal to the receive switch 310. The receive switch 310 provides the receive signal to the LNA 308. The LNA 308 amplifies the receive signal and is configured to provide the amplified signal to the transceiver 206.

The PAMID 210 may be configured to transmit and receive signals substantially simultaneously. In some examples, the PAMID 210 may receive multiple signals in multiple frequency bands. As discussed above, this may arise in the context of carrier aggregation, for example. For example, the PAMID 210 may receive multiple receive signals at the ASM 306, and the ASM 306 may route each of the receive signals to respective duplexers of the duplexers 304. The PAMID 210 may also transmit signals while receiving carrier-aggregated receive signals, also referred to herein as "carrier-aggregation signals."

In one example, the PAMID 210 may transmit a signal while receiving two or more carrier-aggregation signals. In some examples, the transmit signal and each of the two or more carrier-aggregation signals may be within the low band. For example, the transmit signal may occupy the same frequency band as one of the carrier-aggregation signals. The carrier-aggregation signals may be combined in the ASM 306 such that the duplexer corresponding to one of the carrier-aggregation signals creates undesirable loading on the duplexer corresponding to the other carrier-aggregation signal. Combining multiple receive bands, as in the case of carrier aggregation, may require different antenna-matching values as compared to single-band operation at least in part due to the duplexer loading. In examples in which the PAMID 210 is also transmitting signals, this duplexer loading may adversely impact transmit performance. For example, if carrier-aggregation is implemented for a first band and a second band, but a transmit signal is also being sent on the first band, a duplexer corresponding to the second band may undesirably load a duplexer corresponding to the first band. Accordingly, this duplexer-duplexer loading may adversely impact performance of the PAMID 210.

In various examples, the ASM 306 includes, or is coupled to, one or more phase-shifting components 312 to reduce the duplexer-duplexer loading effect. The one or more phase-shifting components 312 may include one or more inductive components (for example, inductors), one or more capacitive components (for example, capacitors), one or more resistive components (for example, resistors), and so forth. Because the duplexer-duplexer loading effect changes a desired antenna matching value, a desired impedance may depend at least on which receive duplexers (and, correspondingly, which frequency bands) are in operation during carrier aggregation, and may depend on which transmit duplexer (and, correspondingly, which frequency band) is in operation during carrier aggregation. In at least one example, a state of the ASM 306, which may be controlled by the controller 214, may be dictated by (that is, controlled by) a state of the transmit switch 302.

Accordingly, the one or more phase-shifting components 312 (for example, one or more inductors, one or more capacitors, a combination of both, and so forth) may be selectively coupled to the ASM 306 based at least in part on a frequency band of the receive signals and/or transmit signal. Selectively switching a capacitor and/or inductor, for example, to the ASM 306 may modify an impedance to compensate for the change in antenna-matching values caused by the duplexer-duplexer loading effects discussed above.

Figure 4:
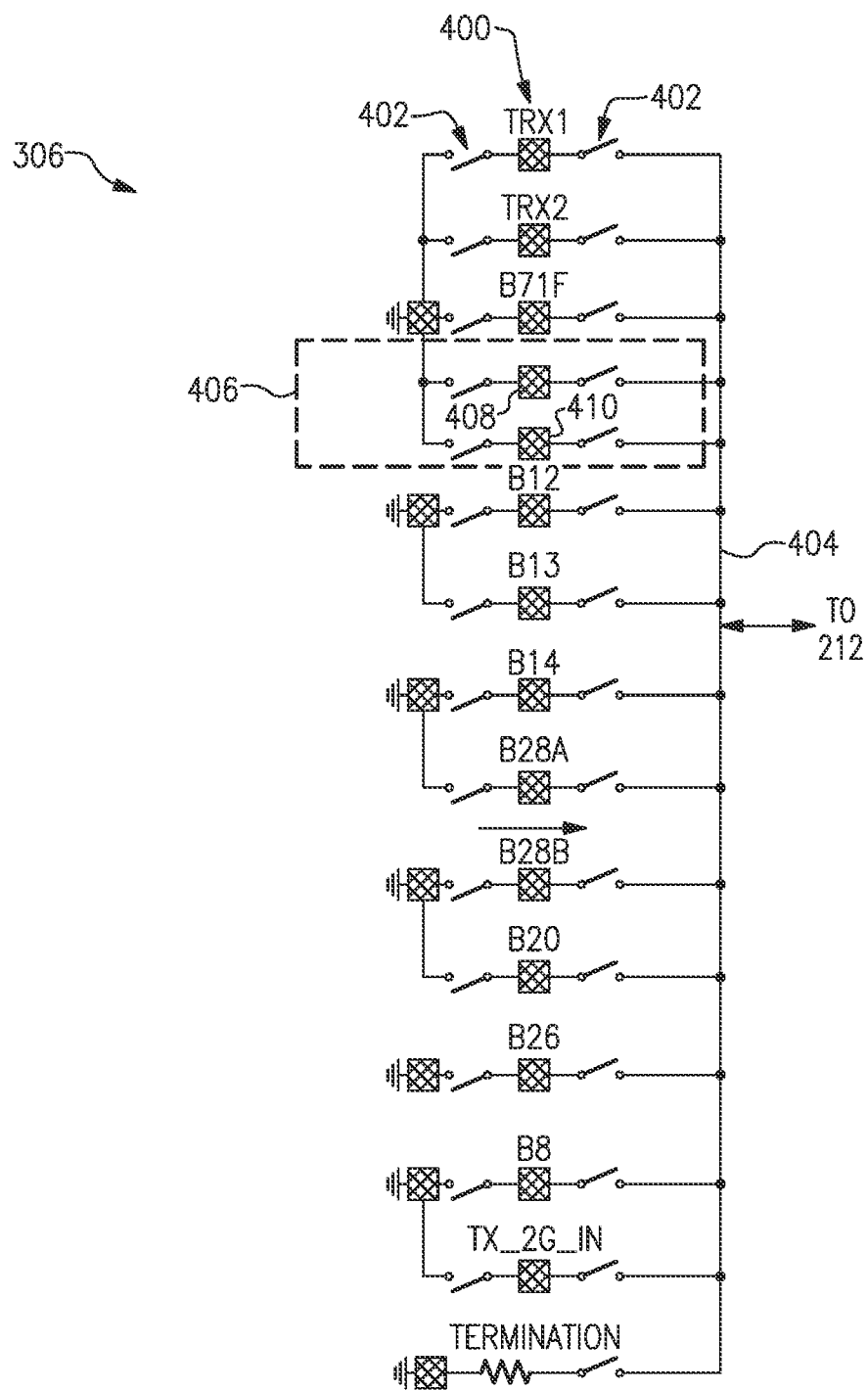
FIG. 4 illustrates a schematic diagram of an antenna switch module according to an example.

FIG. 4 illustrates a schematic diagram of the ASM 306 according to an example. The ASM 306 includes an arbitrary number of connection ports 400 (for example, TRX1, TRX2, B71F, phase_shift1, phase_shift2, and so forth), an arbitrary number of switching devices 402, and an antenna node 404. Each of the switching devices 402 is configured to be coupled to a respective connection port of the connection ports 400, and may selectively couple or decouple a corresponding connection port to the antenna node 404 and/or to a termination load or reference voltage. In at least one example, the switching devices 402 may be field-effect transistors (FETs), or other known switching devices. In some examples, the controller 214 may be coupled to, and control a state of, each of the switching devices 402. The antenna node 404 is configured to be coupled to the antennas 212.

At least a first set of the connection ports 400 are configured to be coupled to respective duplexers of the duplexers 304, and each may therefore correspond to a respective frequency band (for example, bands B71F, B12, B13, B14, B28A, B28B, B20, B26, B8, and so forth). The switching devices 402 may selectively couple or de-couple the connection ports 400 to the antenna node 404 based on a frequency band of a receive or transmit signal. For example, if the ASM 306 is receiving a receive signal in the B8 band, the switching device(s) coupled to the connection port(s) corresponding to the B8 band may be controlled to be in a closed and conducting position or state such that the B8-band connection port is coupled to the antennas 212 via the antenna node 404. Selected ones of the duplexers 304 may thereby be selectively coupled to the antenna node 404 by actuating the switching devices 402.

At least a second set of the connection ports 400 is configured to be coupled to respective phase-shifting components (for example, the one or more phase-shifting components 312). For example, a set of phase-shifting connection ports 406 may include a first connection port 408 and a second connection port 410. The first connection port 408 may be coupled to a first set of one or more phase-shifting components (for example, of the phase-shifting components 312) and the second connection 410 may be coupled to a second set of one or more phase-shifting components (for example, of the phase-shifting components 312). The first set and/or second set of one or more phase-shifting components may each include one or more capacitors and/or one or more inductors. For example, the first connection port 408 may be coupled to an inductive component (for example, an inductor IND1) and the second connection port 410 may be coupled to a capacitive component (for example, a capacitor Cap1), or vice versa. Switching devices corresponding to each of the first connection port 408 and the second connection port 410 may selectively couple or decouple the connection ports 408, 410 to the antenna node 404.

Accordingly, the set of phase-shifter connection ports 406 enables the phase-shifting components 312 to be selectively coupled and/or decoupled to or from the antenna node 404. For example, the phase-shifting components 312 may be selectively coupled to the antenna node 404 at least in part to offset duplexer-duplexer loading effects. In one example, the phase-shifting components 312 are selectively coupled or decoupled based on a frequency band of a transmit signal and a respective frequency band of each receive signal while the PAMID 210 is operating in carrier-aggregation mode.

In one example, the first connection port 408 is coupled to an inductor and the second connection port 410 is coupled to a capacitor. Table 1 depicts an example of selectively coupling the connection ports 408, 410 to the antenna node 404 based on a state of the ASM 306 (which may, in turn, be based on frequency bands of carrier-aggregation signals) and based on a state of the transmit switch 302 (which may, in turn, be based on a frequency band of a transmit signal). For example, the state of the elements coupled to the ports 408, 410 may correspond to the state of the ASM 306 and the state of the transmit switch 302 at least because the states of the components 302, 306 affects an impedance that the elements coupled to the ports 408, 410 are to offset and that is presented to the power amplifier 300.

TABLE 1

Example Switching-Device States

| ASM STATE | | TXSOI STATE | | IND1 | Cap1 |
|---|---|---|---|---|---|
| 10000 | CA B8-B28A | 0001 | B8 ON | 1 | 0 |
| 10000 | CA B8-B28A | 0111 | B28A ON | 0 | 1 |
| 10001 | CA B8-B28B | 0001 | B8 ON | 1 | 0 |
| 10001 | CA B8-B28B | 1000 | B28B ON | 0 | 1 |
| 10010 | CA B8-B20 | 0001 | B8 ON | 0 | 1 |
| 10010 | CA B8-B20 | 0011 | B20 ON | 1 | 0 |
| 10011 | CA B26-B28A | 0010 | B26 ON | 0 | 1 |
| 10011 | CA B26-B28A | 0111 | B28A ON | 0 | 1 |

For example, using a first row of Table 1 as an example, the ASM 306 is operating in carrier-aggregation mode in bands B8 and B28A. The transmit switch 302 is also transmitting a transmit signal in band B8. As discussed above, the duplexer-duplexer loading effects between a duplexer corresponding to band B8 and a duplexer corresponding to band B28A may adversely impact performance of the transmit signal in band B8. Accordingly, the first connection port 408 (which in one example, as discussed above, is coupled to an inductor IND1) is coupled to the antenna node 404 at least in part to offset the duplexer-duplexer loading effects. For example, the duplexer-duplexer loading effects may introduce a capacitive impedance which is offset by coupling an inductor to the antenna node 404. Performance of the ASM 306 is thereby enhanced.

In another example, using a second row of Table 1 as an example, the ASM 306 is still operating in carrier-aggregation mode in bands B8 and B28A. However, the transmit switch 302 is transmitting a transmit signal in band B28A. As discussed above, the duplexer-duplexer loading effects between a duplexer corresponding to band B28A and a duplexer corresponding to band B8 may adversely impact performance of the transmit signal in band B28A. Accordingly, the second connection port 410 (which in one example, as discussed above, is coupled to a capacitor Cap1) is coupled to the antenna node 404 at least in part to offset the duplexer-duplexer loading effects. For example, the duplexer-duplexer loading effects may introduce an inductive impedance which is offset by coupling a capacitor to the antenna node 404. Performance of the ASM 306 is thereby enhanced.

Accordingly, performance of the ASM 306 may be enhanced at least in part by offsetting loading effects introduced in carrier-aggregation modes. In some examples, a state of the ASM 306 is controlled by a state of the transmit switch 302, such that which phase-shifting component is coupled to the antenna node 404 is dependent on a state of the transmit switch 302. Outside of carrier-aggregation mode, the phase-shifting components may be decoupled from the antenna node 404. In some examples, both of the phase-shifting components may be coupled to the antenna node 404 simultaneously.

In various examples, the ASM 306 may include a connection port coupled to an inductor (for example, the first connection port 408) and/or a connection port coupled to a capacitor (for example, the second connection port 410). In some examples, the ASM 306 may include at least one connection port coupled to multiple components. For example, the ASM 306 may include a network of switchable components including multiple inductors, multiple capacitors, and/or multiple resistors, such that the ASM 306 may vary a capacitance, inductance, and/or resistance provided to the antenna node 404. Furthermore, each of the components may have a tunable value (for example, a tunable capacitance, inductance, and/or resistance) such that a capacitance, inductance, and/or resistance provided to the antenna node 404 may be varied.

Although in some examples a state of the ASM 306 (and, consequently, which phase-shifting components are coupled to the antenna node 404) may be controlled by the transmit switch 302, in other examples a state of the ASM 306 may be controlled independently from the transmit switch 302. As discussed above, the transmit switch 302 and/or ASM 306 may be controlled by the controller 214, which may be internal or external to the PAMID 210.

Although some examples may be particularly advantageous in the context of low-band-low-band carrier aggregation in which bands are relatively close in frequency, the principles of the disclosure are more broadly applicable to carrier aggregation of additional or different bands. Furthermore, although certain switching arrangements are illustrated to selectively couple the phase-shifting components to the antenna node 404, in other examples other switching arrangements may be provided to selectively couple the phase-shifting components to the antenna node 404, or to other components of the wireless device 104, provided that the phase-shifting components may introduce impedance effects with respect to one or more signals as discussed above.

FIG. 4 may illustrate only a portion of the ASM 306 in some examples, and portions of the ASM 306 may be omitted for purposes of clarity. For example, the ASM 306 may additionally include one or more couplers, one or more antenna connections corresponding to respective antennas, one or more switching components, one or more inductors, one or more capacitors, and so forth, which are not illustrated for purposes of clarity.

Various controllers, such as the controller 214, may execute various operations discussed above. Using data stored in associated memory and/or storage, the controller 214 also executes one or more instructions stored on one or more non-transitory computer-readable media, which the controller 214 may include and/or be coupled to, that may result in manipulated data. In some examples, the controller 214 may include one or more processors or other types of controllers. In one example, the controller 214 is or includes at least one processor. In another example, the controller 214 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A wireless device comprising:
   one or more antennas;
   a first duplexer configured to receive a transmit signal and a first carrier-aggregated receive signal;
   a second duplexer configured to receive a second carrier-aggregated receive signal, the second carrier-aggregated receive signal being in a different frequency band than the first carrier-aggregated receive signal;
   an antenna switch module (ASM) coupled between the first duplexer and the second duplexer and the one or more antennas;
   one or more phase-shifting components; and
   at least one controller configured to selectively couple at least one phase-shifting component of the one or more phase-shifting components to the ASM based on a respective frequency of each of the transmit signal, the first carrier-aggregated receive signal, and the second carrier-aggregated receive signal.

2. The wireless device of claim 1 further comprising at least one transmit switch coupled to the first duplexer and the second duplexer.

3. The wireless device of claim 2 wherein the at least one controller is configured to select the at least one of the one or more phase-shifting components based on a state of the at least one transmit switch.

4. The wireless device of claim 1 wherein the one or more phase-shifting components includes at least one of a capacitor or an inductor.

5. The wireless device of claim 1 wherein the transmit signal and the first carrier-aggregated receive signal belong to a first frequency band.

6. The wireless device of claim 1 further comprising one or more switching devices, wherein each switching device is coupled to a respective phase-shifting component of the one or more phase-shifting components.

7. The wireless device of claim 6 wherein the one or more switching devices includes a first switching device coupled to the at least one phase-shifting component, and wherein selectively coupling the at least one phase-shifting component to the ASM includes controlling the first switching device to be in a closed and conducting position.

8. A method of controlling a wireless device having one or more antennas, an antenna switch module (ASM) coupled to the one or more antennas, and one or more phase-shifting components, the method comprising:

providing, by the ASM, a transmit signal to the one or more antennas, the transmit signal having a first frequency;

receiving, by the ASM, a first carrier-aggregated receive signal having a second frequency and a second carrier-aggregated receive signal having a third frequency from the one or more antennas, the third frequency being different than the second frequency; and selectively coupling at least one phase-shifting component of the one or more phase-shifting components to the ASM based on the first frequency, the second frequency, and the third frequency.

9. The method of claim 8 wherein the wireless device includes a transmit switch, the method further comprising routing, by the transmit switch, the transmit signal to the ASM.

10. The method of claim 9 further comprising selecting the at least one phase-shifting component to selectively couple to the ASM based on a state of the transmit switch.

11. The method of claim 8 wherein the one or more phase-shifting components includes at least one of a capacitor or an inductor.

12. The method of claim 8 wherein the first frequency and the second frequency belong to a first frequency band.

13. The method of claim 8 wherein the wireless device includes one or more switching devices, each coupled to a respective phase-shifting component of the one or more phase-shifting components, and wherein selectively coupling the at least one phase-shifting component to the ASM includes controlling a respective switching device to be in a closed and conducting position.

14. A non-transitory computer-readable medium storing thereon sequences of computer-executable instructions for controlling a wireless device having one or more antennas, an antenna switch module (ASM) coupled to the one or more antennas, and one or more phase-shifting components, the sequences of computer-executable instructions including instructions that instruct at least one processor to:

control the ASM to route a transmit signal to the one or more antennas, the transmit signal having a first frequency;

control the ASM to route a first carrier-aggregated receive signal having a second frequency and a second carrier-aggregated receive signal having a third frequency from the one or more antennas, the third frequency being different than the second frequency; and selectively couple at least one phase-shifting component of the one or more phase-shifting components to the ASM based on the first frequency, the second frequency, and the third frequency.

15. The non-transitory computer-readable medium of claim 14 wherein the wireless device includes a transmit switch, and wherein the instructions further instruct the at least one processor to control the transmit switch to route the transmit signal to the ASM.

16. The non-transitory computer-readable medium of claim 15 wherein the instructions further instruct the at least one processor to select the at least one phase-shifting component to selectively couple to the ASM based on a state of the transmit switch.

17. The non-transitory computer-readable medium of claim 14 wherein the first frequency and the second frequency belong to a first frequency band, and the third frequency does not belong to the first frequency band.

18. The non-transitory computer-readable medium of claim 14 wherein the wireless device includes one or more switching devices, each coupled to a respective phase-shifting component of the one or more phase-shifting components, and wherein selectively coupling the at least one phase-shifting component to the ASM includes controlling a respective switching device to be in a closed and conducting position.

* * * * *